Patented Feb. 23, 1954

2,670,271

UNITED STATES PATENT OFFICE 2,670,271

PROCESS OF RECOVERING METAL VALUES FROM LEACH LIQUORS

Alfred M. Thomsen, San Francisco, Calif.

No Drawing. Application November 27, 1948, Serial No. 62,423

2 Claims. (Cl. 23—119)

My process may be regarded chiefly as providing an advance over other methods now currently in use for the purpose of precipitating metals that have been put into solution by some acceptable means. It involves, therefore, such solutions as that mixture of metallic salts obtained in the Longmaid-Henderson method of chloridizing, roasting and leaching and also such by-products of industry as are presented by copper refining and the steel and galvanizing industries. In all of these places some soluble metallic salts are produced, notably the pickle liquor obtained in cleaning steel and the so-called "sal ammoniac skimmings" produced in galvanizing. While these are not properly the result of a hydro-metallurgic step, their subsequent utilizations is, as they consist of a mixture of soluble chlorides, insoluble oxides and metallic prill.

I avail myself of the recent economic advance in nitrogen fixation which has made ammonium hydroxide the cheapest form of alkali, sometimes even approaching the cost of burnt lime. Furthermore, while lime used in precipitating is wasted, ammonia used in such precipitation is recoverable in the form of its fixed salts which often have a higher value than the ammonia gas employed.

Anhydrous ammonia in a gaseous form is not well suited for use as a precipitant because of its volatility and the fact that it gives rise to slimy hydroxides that filter with extreme difficulty. I overcome this impediment in the use of ammonia by first of all combining the ammonia with carbonic acid which is easily done by even such a weak source of carbon dioxide as ordinary chimney gases. I find that putting such a mixture through a coke tower irrigated with water will give a solution containing as much as 30% ammonium carbonate and nothing would be gained by attempting to use stronger solutions.

The Longmaid-Henderson process is too well known to need description here. It is thoroughly written up in Lunge's classic work on alkali, in Hoffman's "Hydro-Metallurgy" and similar works so that no descriptions are needed here except to call attention to the fact that the leach liquor consists of a mixture of the sulphates and chlorides of sodium, iron, copper and zinc, while gold, silver and lead are at times present in small amounts. The iron, of course, is always present in the ferric state.

The addition of a sufficient amount of carbonated ammonia to this solution results in a complete precipitation of ferric iron. Further treatment with hydrogen sulphide will precipitate copper, silver and lead, jointly, the solution becoming slightly acid due to the regeneration of said acid by interaction with hydrogen sulphide thus causing the zinc to remain in solution. After removal of the precipitate produced by hydrogen sulphide this acidity is now neutralized with fresh carbonated ammonia and the zinc precipitated by a further addition of said precipitant.

These precipitates all filter beautifully and there is no mechanical difficulty involved, particularly the zinc carbonate produced in the latter reaction can be handled as a two inch cake upon any orthodox vacuum filter while zinc hydroxide is almost unfilterable.

Having thus removed the heavy metals by interaction with ammonia gas and carbon dioxide, the residual liquor is now a mixture of the sulphates and chlorides of ammonium and sodium. No particular difficulty is presented by the separation into its constituents. By taking due advantage of the appropriate technique, it is possible to obtain the sodium in the form of sodium sulphate and the ammonium in the form of ammonium chloride, or as it is generally called, "sal ammoniac." If the solution is merely evaporated to a high concentration anhydrous sodium sulphate separates out and on cooling the mother liquor yields a crop of very pure sal ammoniac. Contrarywise, if the more dilute solution is allowed to cool, a mixed crystallization containing sodium and ammonium as sulphates may be obtained and this in turn can be separated into sodium sulphate and ammonium sulphate.

It is, manifestly, impossible to give a complete illustration of any actual chemical composition of such a liquor as I have herein described coming from the Longmaid-Henderson process, as it would vary entirely with the ore subjected to the treatment and this variation is limitless. It will be seen, however, that it involves nothing but orthodox chemistry to test the solution as the various precipitations are made.

Thus, test a filtered sample of solution until it is iron free at the first step and then pass the material on to filtration; test with excessive sulphide in the second step, thus proving the complete removal of the $H_2S$ group when a tank full of material in turn is passed on to the filter; finally the adding of enough material to the residual solution until it in turn tests free from zinc, or rather, until no further precipitate is produced by any further quantity of the reagent employed.

I will now pass on to two other types of liquor where a more precise description can be given. The first of these is represented by the pickle liquor of the steel industry. If this material be commingled with an amount of carbonated ammonia water until no further precipitation is produced, then said ammonia has become ammonium sulphate and the iron separates out as ferrous carbonate. Boiling will remove any excess of ammonia and render the precipitate even more manageable but even without this it filters well. A small amount of iron remains in solution but inasmuch as the overwhelming use for ammonium sulphate is as a fertilizer, the presence of a small amount of residual iron will do no harm. If it is desired to remove it, then this is easily done by simply blowing air through the solution in which case the residual iron separates out as ferric hydroxide.

Manifestly, it is within the scope of any chemist to analyze pickle liquor for its constituent ingredients of free sulphuric acid and iron sulphate and to determine the precise amount of carbonated ammonia solution to add to same to secure the results previously specified. The residual solution containing virtually nothing but ammonium sulphate is, of course, evaporated and crystallized in the orthodox manner.

There has thus been obtained a separation of the pickle liquor into its iron constituent and its sulphuric acid component.

Passing on now to the second illustration; namely, the use of the same carbonated form of ammonia in the treatment of sal ammoniac skimmings, I proceed as follows: Sal skimmings are disintegrated by the solution of their contained chlorides in water. The resultant slurry is commingled with enough carbonated ammonia to precipitate the dissolved metals which are zinc, with perhaps a minimal amount of iron. The residual solution is ammonium chloride. The solid residue is a mixture of metallic prill, zinc oxide and zinc carbonate. If desired the prill can be removed settling or screening and the remainder will constitute prime material for zinc melting. Naturally, both can be used for the manufacture of any salt of zinc desired. Here, again, one cannot apply a proper formula giving relative percentages because the actual composition of such skimmings will vary as widely as there are operators in galvanizing. However, when it is borne in mind that it is desirable to raise the precipitated mixture to boiling and that this automatically removes any excess of ammonia and carbonic acid which has been employed, it will be seen that such excess is self-limited. Here again, the operator can proceed by the addition of carbonated ammonia to the slurry until a filtered sample from his reaction tank will not show any further precipitate with additional carbonated ammonia water. The expression "carbonated ammonia water" is used advisedly for this is not ammonium carbonate, per se, but rather a mixture of some free ammonia, some carbonate, some carbamate and some bicarbonate. Manifestly, basic zinc salts and even metallic zinc present in said skimmings can be converted to soluble zinc salts prior to the addition of the precipitant.

Similarly, to treat the ammonia with hydrogen sulphide instead of with carbonic acid, would also permit of a variant in technique, where zinc is the metal involved. In this case, if such a solution of hydrogen sulphide and ammonia be used as a precipitant on a pure zinc solution, such as would result in the Longmaid-Henderson process, or as would be obtained from sal skimmings by a filtration step after disintegration in water and before adding any reagent, then the zinc would be obtained directly in the form of zinc sulphide in which form it has rather high value as a pigment. Such minor variations, I consider as being within the scope of my disclosure.

Having thus fully described my process, I claim:

1. In the process of dissolving and separating metal values from finely ground metal bearing ores by roasting with a chloride salt followed by lixiviation of the calcined charge and, thereby, solution of the metal values and, thereafter, precipitation of the metal values from the leach liquor so obtained, the steps of treating a leach liquor of said process comprising sulfates and chlorides of iron, zinc, copper, silver, lead and alkali metal with a solution produced by commingling a flue gas containing carbon dioxide, ammonia gas and water to form a water solution of a carbonated form of ammonia, said solution being added in sufficient amount to precipitate the iron component of the leach liquor as ferric hydroxide, and separating said precipitate, commingling the residual leach liquor with hydrogen sulfide to precipitate copper, silver, lead and other members of the H2S group, and separating the sulfide precipitate thus obtained, neutralizing the residual leach liquor which has become acid through regeneration, and precipitating the resident heavy metal present therein by the addition of a further quantity of the said solution of a carbonated form of ammonia, separating the precipitate produced thereby and recovering the fixed ammonia salts resident in the said leach liquor by crystallization.

2. In a process of recovering metals from leach liquors, the steps of commingling blue gas containing carbon dioxide, ammonia gas and water to yield a water solution of a carbonated form of ammonia, commingling said solution with a leach liquor containing iron in ferric form, copper and zinc, whereby to precipitate ferric hydroxide until substantially no more ferric hydroxide will be formed by further addition of the carbonated form of ammonia, separating the said ferric hydroxide, commingling the residual leach liquor with hydrogen sulfide to precipitate said copper and separating the sulfide precipitate thus obtained, neutralizing the residual leach liquor which has become acid through regeneration, and precipitating the zinc present therein by the addition of a further quantity of the said solution of a carbonated form of ammonia, separating the precipitate produced thereby, and recovering the fixed ammonia salts resident in the said leach liquor by crystallization.

ALFRED M. THOMSEN.

References Cited in the file of this patent

UNITED STATES PATENTS

| Number | Name | Date |
|---|---|---|
| 656,497 | De Bechi | Aug. 21, 1900 |
| 868,385 | Wulffing | Oct. 15, 1907 |
| 997,237 | Carrick et al. | July 4, 1911 |
| 1,468,988 | Berthelot | Sept. 25, 1923 |
| 1,879,834 | Waring | Sept. 27, 1932 |
| 1,994,702 | Harris | Mar. 19, 1935 |
| 2,131,312 | Colton | Sept. 27, 1938 |
| 2,145,815 | Morrow | Jan. 31, 1939 |
| 2,374,454 | Oliver et al. | Apr. 24, 1945 |

FOREIGN PATENTS

| Number | Country | Date |
|---|---|---|
| 526,628 | Germany | June 8, 1931 |
| 14,618 | Great Britain | 1895 |

OTHER REFERENCES

Prescott and Johnson, "Qualitative Chemical Analysis," (1901) pages 109, 230, 280, 375, New York, D. Van Nostrand.